United States Patent [19]

Duppong et al.

[11] Patent Number: 4,736,633

[45] Date of Patent: Apr. 12, 1988

[54] MULTIPURPOSE LIFTING AND PULLING VEHICLE

[75] Inventors: Denis E. Duppong; Richard L. Brandt; David M. Mick; Leland M. Rieck, all of Cedar Rapids, Iowa

[73] Assignee: FMC Corporation, Chicago, Ill.

[21] Appl. No.: 843,541

[22] Filed: Mar. 25, 1986

[51] Int. Cl.$^{4}$ .................... G01N 3/08

[52] U.S. Cl. .................... 73/837; 73/826

[58] Field of Search .................... 73/826, 827, 834, 835, 73/862.52, 837; 340/984, 52 H, 685; 212/255, 259, 188, 189; 414/739, 735

[56] References Cited

U.S. PATENT DOCUMENTS

| | | | |
|---|---|---|---|
| 2,780,068 | 2/1957 | Grimes | 73/826 |
| 3,586,841 | 6/1971 | Griffin | 73/769 |
| 3,595,072 | 7/1971 | Richards | 73/826 |
| 3,631,995 | 1/1972 | Jones et al. | 414/739 |
| 3,759,094 | 9/1973 | Al | 340/984 |
| 3,796,332 | 3/1974 | Kawamura | 414/739 |
| 4,005,895 | 2/1977 | Cullings | 414/739 |
| 4,212,006 | 7/1980 | Cakebread et al. | 340/685 |
| 4,275,902 | 6/1981 | Teja | 212/189 |
| 4,374,473 | 2/1983 | Brockman | 73/158 |
| 4,486,136 | 12/1984 | Howard | 73/862.48 |

FOREIGN PATENT DOCUMENTS

| | | | |
|---|---|---|---|
| 974623 | 9/1975 | Canada | 340/685 |
| 0008484 | 1/1983 | Japan | 73/116 |

OTHER PUBLICATIONS

FMC Link Belt LS-7400A Crawler Hydraulic Excavator Brochure Illustrating a Crawler Excavator—8 pages.

*Primary Examiner*—Stewart J. Levy
*Assistant Examiner*—Robert R. Raevis
*Attorney, Agent, or Firm*—Raymond E. Parks; Alan J. Moore; Richard B. Megley

[57] ABSTRACT

The multipurpose vehicle of the present invention is designed to operate in and around dry docks and wharfs and its capable of lifting and moving propellers from propeller shafts within areas confined by a ship's rudder and to carry the propeller to an area away from the ship to be lifted to the wharf by crane. The propellers may weigh as much as 75,000 pounds and be 23 feet in diameter. The vehicle may also be used to accurately position keel blocks and haul blocks weighing up to 25,000 pounds in positions to support a ship. The vehicle may be lifted by crane out of dry dock to test padeyes for safety and certification by applying up to a 50,000 pound pulling force to the payeyes. The vehicle's upper arm can be extended to about 40 feet high or can be lowered to a level permitting the vehicle to pull or carry articles into buildings on the wharf.

5 Claims, 8 Drawing Sheets

FIG_2
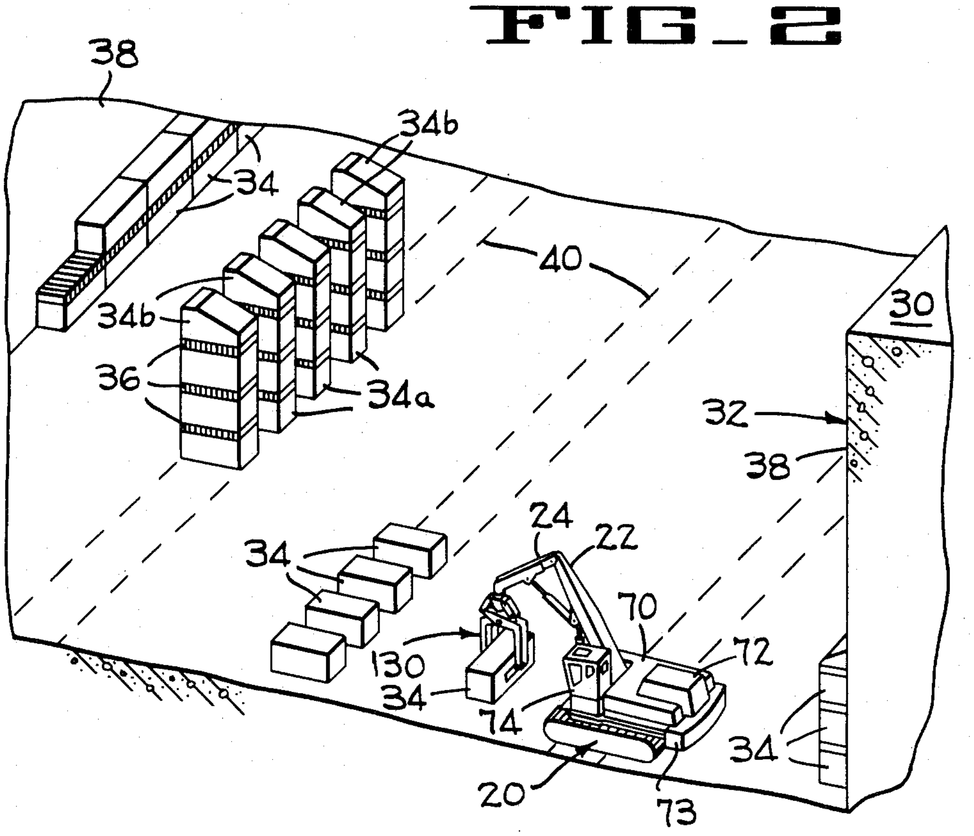
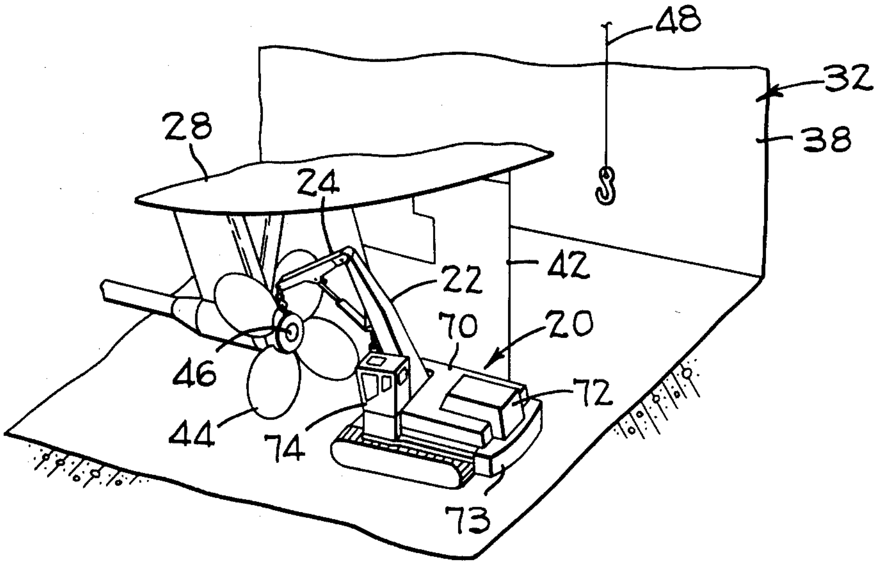
FIG_3

FIG_6
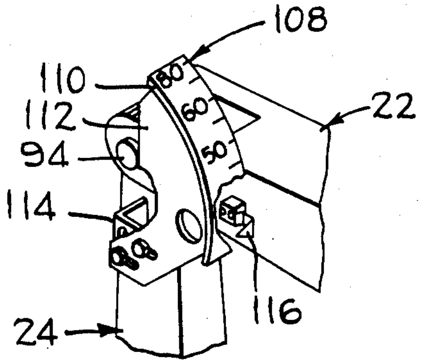
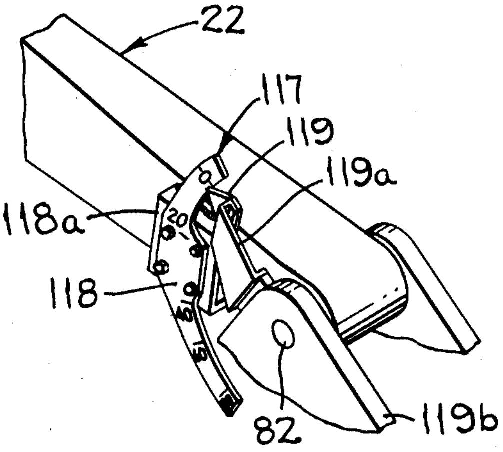
FIG_6A
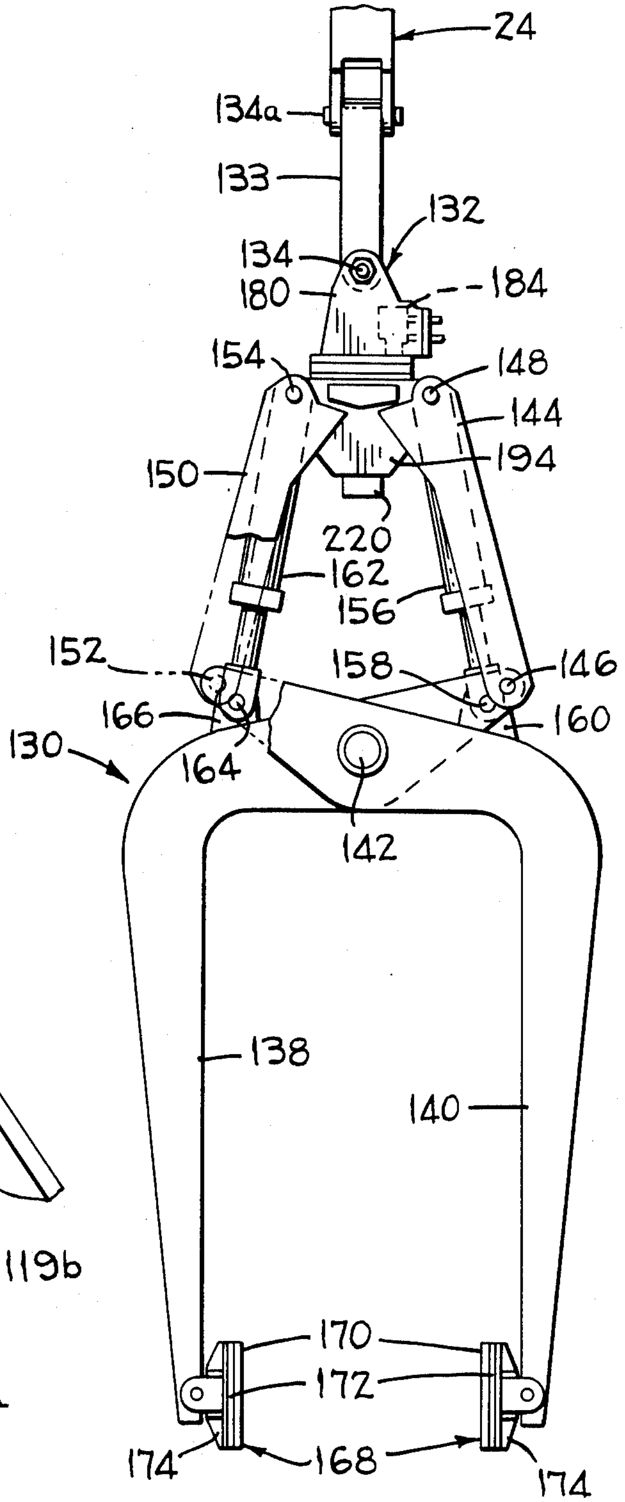
FIG_7

FIG_11
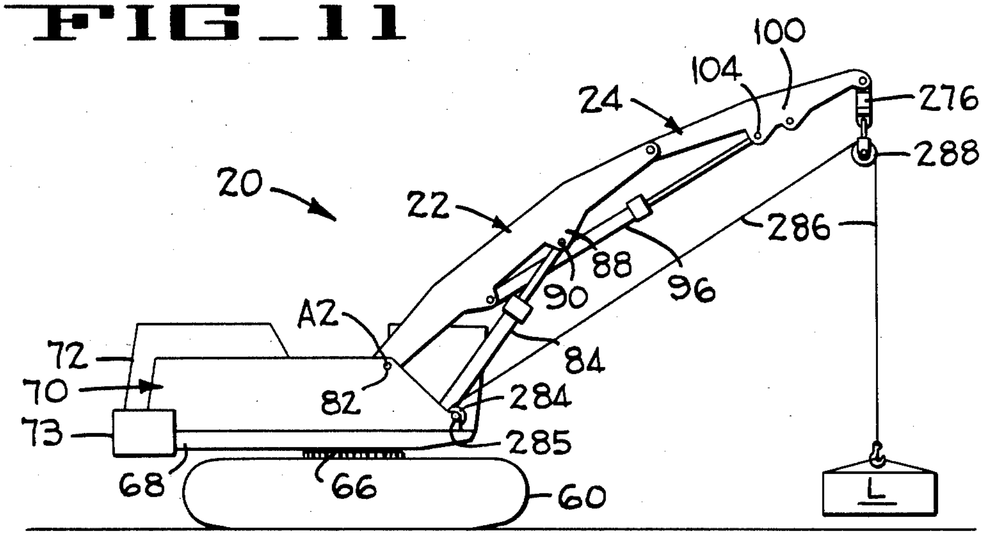
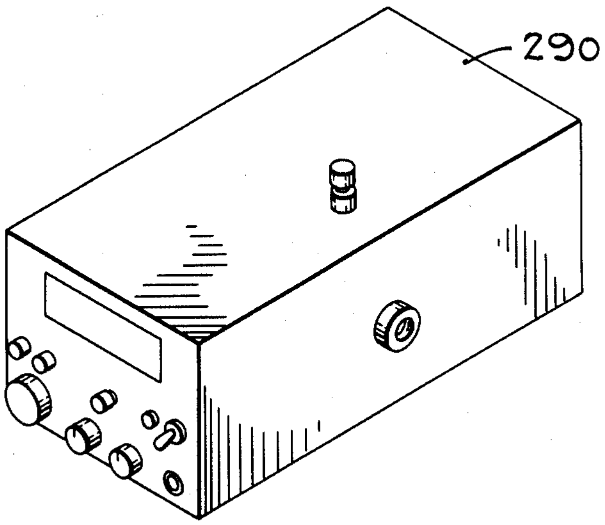
FIG_12

MULTIPURPOSE LIFTING AND PULLING VEHICLE

BACKGROUND OF THE INVENTION

1. Field of the Invention

The present invention relates to a multipurpose lifting, pushing and pulling vehicle, and more particularly relates to a maneuverable ship-repair and testing vehicle capable of working both on wharfs and dry docks for testing and repairing maritime equipment.

2. Description of the Prior Art

Modified cable cranes mounted on wheels and having shortened booms have been used in dry docks for projects such as removing and installing heavy propellers from large naval and merchant vessels and moving heavy objects to different locations. However, these known vehicles are awkward to handle due to their relatively poor maneuverability, especially with loads, and due to their substantial minimum height, which height prevents them from entering normal buildings after being lifted from the dry dock and placed on the wharf.

SUMMARY OF THE INVENTION

The multipurpose lifting, pushing and pulling vehicle is self-propelled and is specifically designed for use in dry docks and on adjacent wharfs for performing functions such as: moving 25,000 pound keel blocks and hull blocks between patterns identified on the floor of the dry docks and storage against the walls of the dry dock; removing and installing propellers weighing up to about 75,000 pounds and having a diameter of about 23 feet on ships including aircraft carriers; testing the strength of padeyes up to about 50,000 pounds for required periodic certification; moving heavy loads into and out of buildings on the wharf; attaching encapsulated life boats to the sides of ships; and many other functions including lifting, pushing outwardly and/or downwardly, winching loads from place to place and moving or pulling heavy loads into buildings on the wharf.

The multipurpose vehicle includes tracks or tread members on an axle frame or lower works which supports a rotating platform or upper works for pivotal movement about a vertical axis. A boom is pivoted to the rotating platform and to an upper arm about horizontal axes, which boom and upper arm are independently pivoted about their horizontal axes by independently controlled hydraulic cylinders for performing precisely controlled lifting and/or pulling functions in confined areas such as pulling large propellers from their shafts without damaging adjacent rudders or the like. Accessories such as swivels, hydraulically actuated grapples and hydraulically actuated padeye testing cylinders may be attached at two different locations to the upper arm for performing specific functions. Outriggers and pontoons are mounted on the front of the lower works for extending the tip over point of the vehicle forward a sufficient amount to prevent tip over of the vehicle when a 50,000 pound horizontal pulling force is applied at the upper end of the arm when the arm and boom are fully raised thus eliminating the need to extend the length of the tracks.

BRIEF DESCRIPTION OF THE DRAWINGS

FIG. 2 is a diagrammatic perspective illustrating the vehicle moving keel blocks and hull blocks between storage positions adjacent the walls of a dry dock to patterns identified on the floor of the dry dock when emptied.

FIG. 3 is a perspective of a fragmet of a dry dock illustrating the vehicle removing a propeller from the ship with the propeller being immediately adjacent a rudder, said perspective also illustrating the load line of a crane on the dock for moving the vehicle and other objects between the dry dock and the wharf.

FIG. 6 is a perspective of an angle gauge for indicating the relative angles between the longitudinal axis of the boom and the upper arm.

FIG. 6A is a perspective illustrating a boom to frame angle indicator.

FIG. 7 is a side elevation of a grapple, certain parts being broken away.

FIG. 11 is an operational view of the vehicle with its winch lifting a load.

FIG. 12 is an elevation of a load indicator which displays forces applied by the test pull cylinder.

DESCRIPTION OF THE PREFERRED EMBODIMENT

Prior to describing the multipurpose vehicle 20 of the present invention it will be helpful in understanding the invention by describing the preferred environment in which the vehicle is to be used.

Figures 4, 4A, 5:
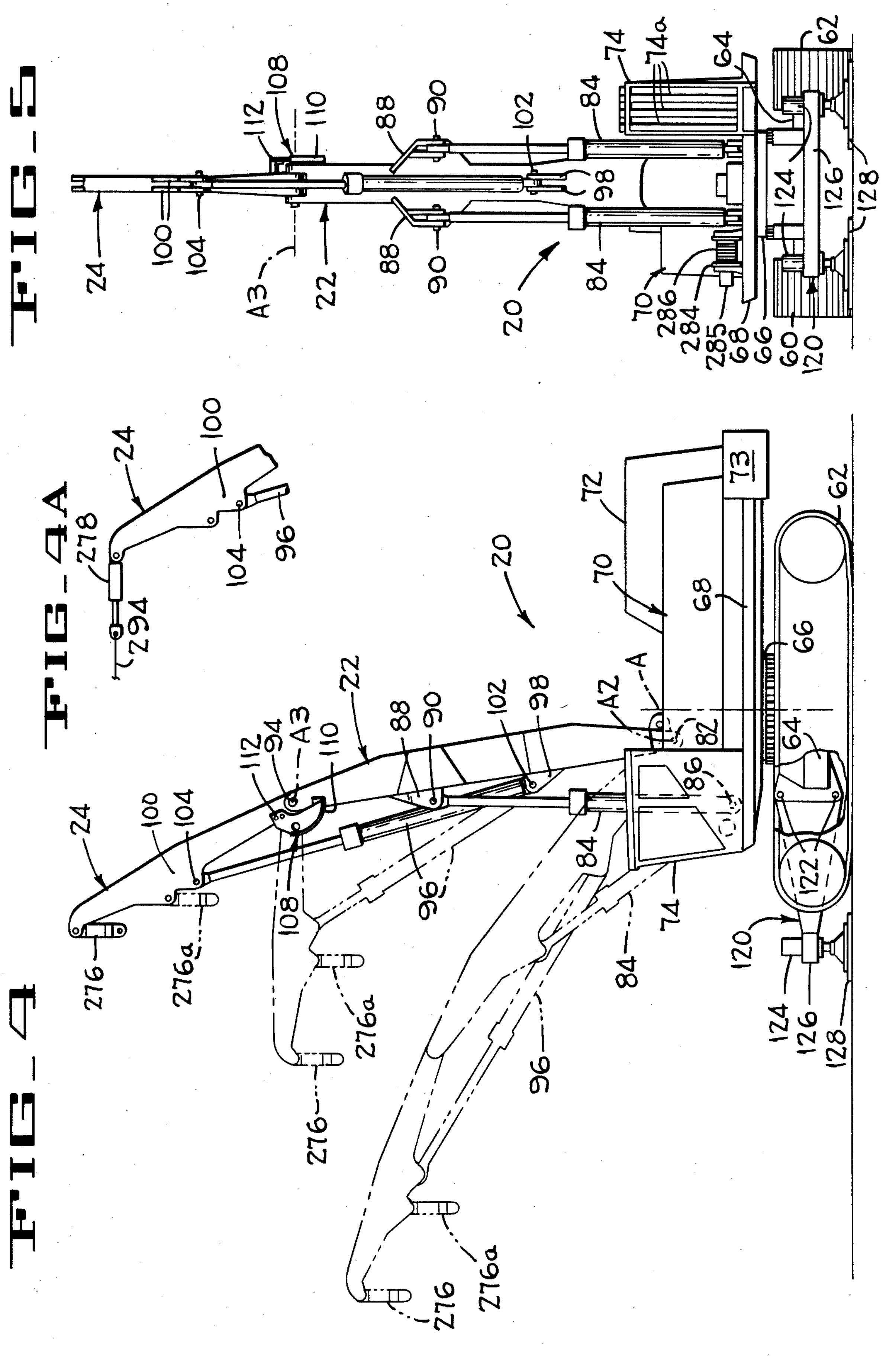
FIG. 4 is a side elevation of the multipurpose vehicle of the present invention illustrating the boom and upper arm in several operative positions.
FIG. 4A is a side elevation of a fragment of the upper arm shown connected to a test pull cylinder.
FIG. 5 is a front elevation of the vehicle.

The multipurpose vehicle 20 (FIGS. 1-3) is specifically designed for lifting, pulling, pushing and carrying heavy objects used in the ship building and ship repairing industry. However, it will be understood that the vehicle is adaptable to perform similar functions in other industries. The boom 22 and upper arm 24 of the vehicle are capable of reaching to a height of about 40 feet and to a horizontal distance of about 34 feet and may be pivoted b 360° about a vertical axis A (FIG. 4).

Figure 1:
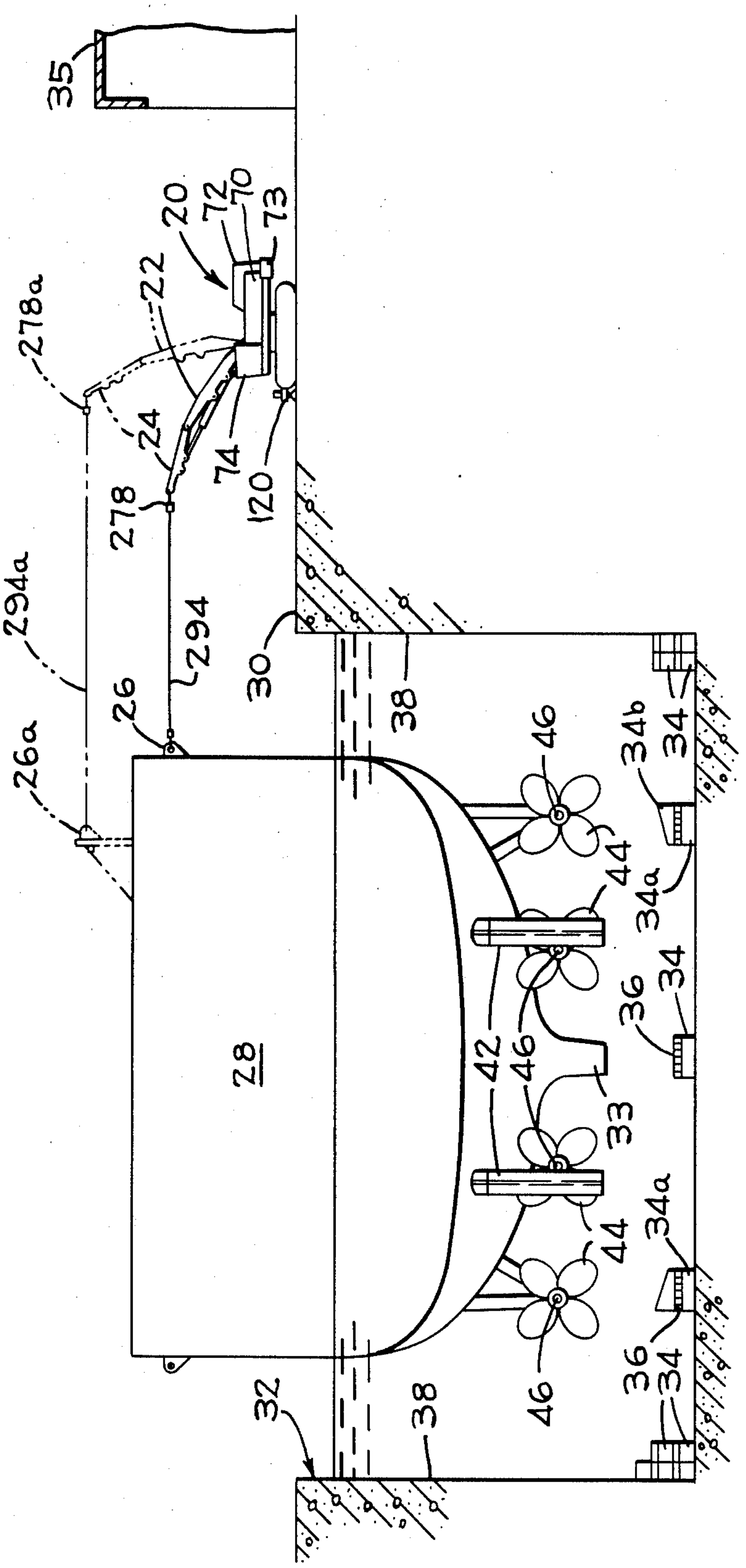
FIG. 1 is a diagrammatic section through a dry dock with the gates open and a ship floating therein above partially layed keel blocks and hull blocks positioned to support the ship when the dry dock is emptied, the multipurpose vehicle being shown on the wharf testing padeyes for certification.

In FIG. 1, the multipurpose vehicle 20 is shown, in two positions in a certification test, connected to padeyes **26,26*a* that are secured to a ship 28 for applying up to about 50,000 pounds testing force against the padeyes. The vehicle 20 is supported on a wharf 30 and the ship is shown floating in a dry dock 32 with its keel 33 above concrete keel blocks 34 and its hull above hull blocks 34*a*** each of which may weigh up to about 25,000 pounds. A fragment of a building 35 is shown on the wharf within which the vehicle may be used.

In FIG. 2 the dry dock 32 has been pumped dry and the multipurpose vehicle 20 is shown carrying a keel block 34 from storage against the walls 38 of the dry dock to a keel pattern 40 identified on the floor of the dry dock 32. It will be understood that most keel blocks and hull blocks are the same size but certain blocks 34*b* are contoured to match the shape of the keel or hull. Planks 36 are disposed between the stacked blocks, and steel lugs 41 (FIG. 9) are embedded in the concrete blocks.

In FIG. 3, the vehicle 20 is in the dry dock 32 alongside a rudder 42 and is shown connected to a propeller 44 of the ship 28 for pulling the propeller from the shaft 46. The load line 48 of a crane (not shown) that is supported on the wharf 30 is illustrated in position to receive the propeller 44 and lift it to the wharf. The crane is also used to lower the multipurpose vehicle 20 into the dry dock and to lift it out of the dry dock for use on the wharf.

The multipurpose vehicle 20 (FIGS. 4 and 5) comprises a pair of tracks 60,62 complete with conventional hydraulic motors and drives (not shown) which are connected to an axle frame 64 which has the lower half of a turn table bearing 66 secured thereto and concentric with axis A. The upper half of the turntable bearing 66 is secured to the rotating platform 68 of an upper works 70. The upper works includes an engine 72, which drives several conventional pumps (not shown) that provide hydraulic power to drive hydraulic motors (not shown) which drive the tracks 60,62 in either direction, rotate the upper works 70 about the axis A in either direction, and provides power to several hydraulic cylinders employed on the vehicle. A counterweight 73 is removably attached to the rear end of the upper works 70. Conventional operator controls and conventional hydraulic and electrical controls are provided for performing the above functions. The conventional controls are located in a cab 74 secured to the upper works 70 and may be controlled by an operator when seated in the cab to perform the above standard functions.

The components of the multipurpose vehicle 20 as thus far described are substantially the same as those used in Assignee's LS-7400A crawler hydraulic excavator and are conventional in the art.

The boom 22 (FIGS. 4 and 5) is pivotally supported on the upper works 70 by pivot pin 82 for pivotal movement about a first horizontal axis A2 through an arc of about 80° between a horizontal and a near vertical position illustrated in solid lines in FIG. 4. A pair of spaced hydraulic boom cylinders 84 are connected to the upper works 70 by pins 86 (FIG. 4), and to brackets 88 (FIG. 5) welded to the sides of the boom, by pins 90. The upper arm 24 is pivotally connected to the boom by a second horizontal pin 94 for rotation about a second horizontal axis A3. A second hydraulic cylinder 96 is pivotally connected between lugs 98 on the underside of the boom 22 and lugs defined by side walls 100 of the upper arm 24 by pins 102 and 104, respectively. The upper arm 24 may be pivoted between its illustrated uppermost position in FIG. 4 downwardly approximately 84°. Conventional hydraulic controls in the cab 74 may be used by the operator to selectively pivot the boom 22 and upper arm 24 between their several operative positions.

FIG. 6 illustrates an upper arm angle indicator 108. The indicator 108 includes an arcuate plate 110 rigid with an arm 112 that is adjustably secured to a bracket 114 welded to the upper arm 24. A pointer 116 is secured to the boom 22 and is illustrated at a 0° position which indicates that the longitudinal axis of the arm 24 is at 90° to the longitudinal axis of the boom 22.

FIG. 6A illustrates a boom to frame angle indicator 117 which includes an arcuate scaled plate 118 bolted to a bracket 118*a* that is welded to the left side of the boom 22. A pointer 119 is bolted to a bracket 119*a* that is secured to the left boom support 119*b* on the upper works 70. When the boom is in the horizontal position illustrated in FIG. 6A, the pointer 119 is opposite the 0° reading on the scale plate 118. It will be noted that the boom may be elevated from its horizontal position approximately 84°. It will be understood that the operator refers to incab capacity plates to determine allowable machine lifting capacities and operating procedures.

An outrigger assembly 120 (FIGS. 4 and 5) is connected to the forward end of the axle frame 64 by four pins 122 (only two being shown). A pair of hydraulic jacks 124 are rigidly secured to a transverse beam 126 at the front end of the assembly 120 and are selectively raised or lowered by the operator by operating conventional controls on the outrigger assembly for directing hydraulic fluid in the selected direction to the jacks 124 through a conventional circuit to be described hereinafter. A bearing plate 128 is preferably positioned below each jack and the surfaces upon which the vehicle is supported for distributing the force applied by the jacks over a wide area. The outrigger jacks are used only when forces acting on the vehicle tend to tip the vehicle over such as might occur when testing padeyes or the like as indicated in FIG. 1. When performing other functions, the pins 122 (FIG. 4) may be withdrawn and the outrigger assembly 120 may be removed from the vehicle 20.

Figure 9:
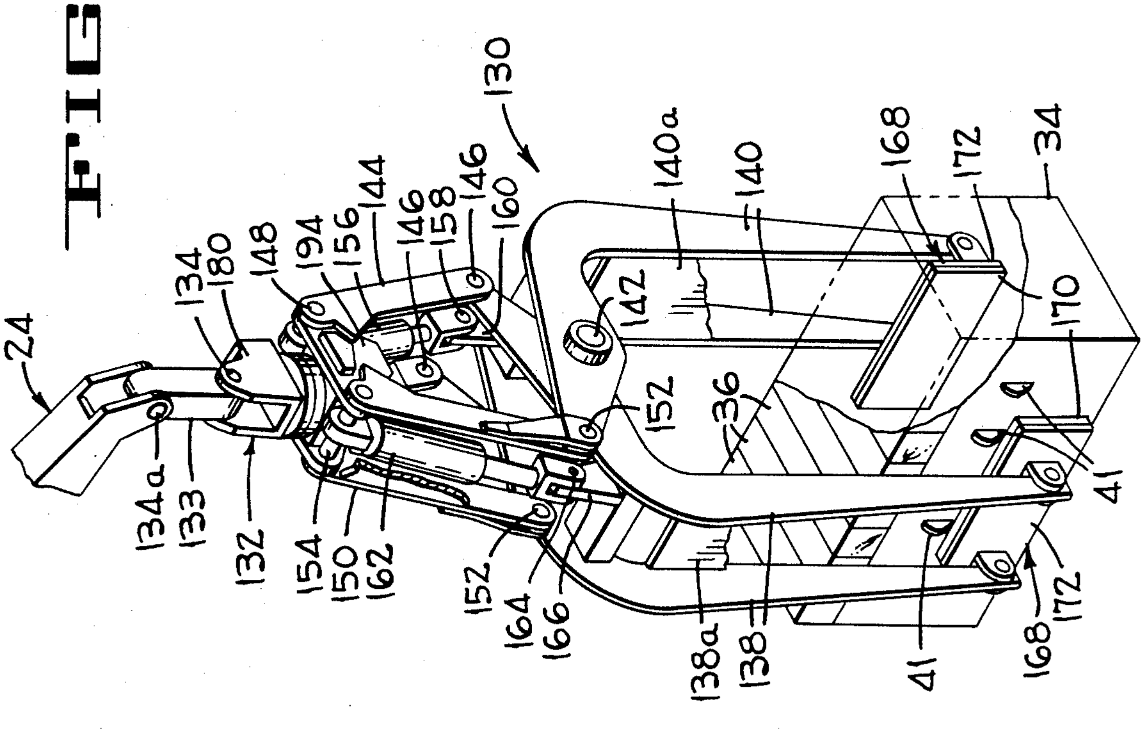
FIG. 9 is an enlarged view in perspective illustrating a hydraulically actuated grapple lifting a keel block, certain parts of the block and grapple being cut away.

As best shown in FIGS. 7 and 9, a grapple 130 includes and is connected to the upper arm 24 of the vehicle by a hydraulically powered swivel joint 132 having its upper portion connected to the arm 24 by a crosshead 133 and pivot pins 134,134*a*. The grapple 130 includes angle tongs 138,140 pivotally connected together intermediate their ends by a pivot pin 142. The tongs 138,140 each include a stiffening plate 138*a*,140*a*, respectively, which are shown partially cut away. The upper ends of the grapple tong 138 is pivotally connected to the swivel joint 132 by a generally U-shaped support arm 144 by pairs of pivot pins 146, and an upper pin 148; and the upper ends of the tong 140 is pivotally connected to the swivel joint 132 by a U-shaped support arm 150 by a pair of pins 152, and an upper pin 154. One end of a first hydraulic cylinder 156 is connected by a pivot pin 158 to a lug 160 welded to the upper portion of the tong 140, and has its upper end pivotally supported by the pivot pin 148. Similarly, one end of a second hydraulic cylinder 162 is connected by a pivot pin 164 to a lug 166 welded to the upper portion of the tong 138; and has its upper end pivotally supported by the pivot pin 154. Thus, extension of the cylinders 156,162 will move the lower portion of the tongs 138,140 together, and retraction of the cylinders will move the tongs away from each other.

In order to firmly grip the keel blocks 34, or other articles, a block engaging shoe 168 (FIG. 7) is pivotally connected to the lower end of each tong 138,140. Each shoe includes a rubber article engaging pad 170 and wood backup members 172 that are bolted to a steel mounting body 174 of the associated tongs 138,140.

Figure 8:
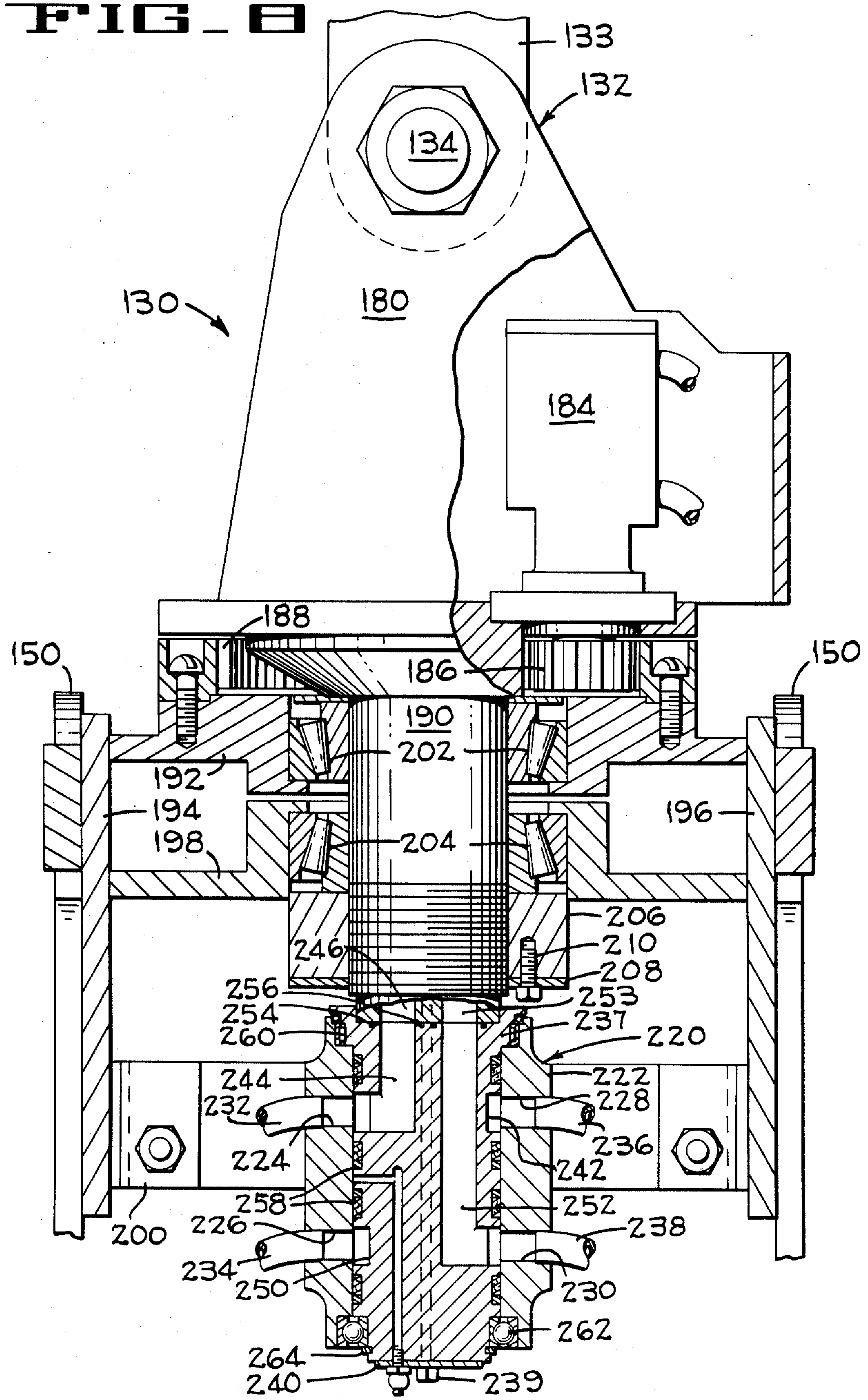
FIG. 8 is an enlarged elevation with parts cut away and other parts in central section illustrating components of the swivel joint which supports the grapple.

As illustrated in FIG. 8, the swivel joint 132 comprises an upper portion in the form of a yoke 180. A hydraulic motor 184 is bolted to the yoke and drives a spur gear 186 which drives an internal ring gear 188. A spindle 190 is rigidly secured to the yoke 180, projects downwardly therefrom, and is concentric with the ring gear 188. The ring gear is bolted to a first outer bearing support 192 which is rigidly secured to end plates 194,196 that are shown rotated 90° as compared to FIG. 7. A second outer bearing support 198 and a rotary union support 200 are likewise rigidly secured to said end plates 194,196. A pair of anti-friction bevel bearings 202,204 are received about the spindle 190 within the bearing supports 192,198, respectively. A nut 206 is screwed on the spindle 190 and supports the end plates 194,196 and all members supported thereon from downward-movement relative to the yoke 180. An adjusting lock washer 208 fitted in a keyway (not shown) and capscrew 210 locks the nut 206 to the spindle in position to support the end plates 194,196 and all rotatable portions of the grapple 132 (FIG. 7) which rotate about the spindle in response to being driven by the hydraulic motor 184.

A rotary union 220 includes a sleeve 222 rigidly secured to the union support 200 and includes ports 224,226 which are connected to the cylinder 162 and ports 228,230 which are connected to the cylinder 156 by hoses 232,234 and 236,238 respectively. The ports 224 and 228 are connected to the upper end of cylinders 162,156; and the ports 226,230 are connected to the lower ends of cylinders 162,156 by the above hoses. A spindle extension 237 is rotatably received within the sleeve 222 and has its upper end counterbored to receive the lower end of the spindle 190 which is rigidly secured thereto by a pair (only one being shown) of long capscrews 239 which extend through a closure plate 240. A first annular passage 242 in the spindle extension communicates with the ports 224,228 and with a bore 244 in the spindle extension 237. The bore 244 communicates with a bore 246 which extends through the spindle 190 and is connected to a hydraulic circuit to be described hereinafter. The ports 226,230 communicate with the second annular passage 250, with a bore 252 in the spindle extension 237, and with a bore 253 which extends through the spindle 190 and is connected to the hydraulic circuit as will be described. A plurality of annular grooves are formed in the spindle extension 237 and receive conventional fluid seals 254 and 256, or packing 258 for providing fluid seals between the spindle 190, sleeve 222 and the spindle extension 237. Also, a needle bearing 260 and a ball bearing 262, which ball bearing is held in place by a snap ring 264, are disposed between the sleeve 222 and the spindle extension 237.

FIG. 9 illustrates the grapple 130 lifting a keel block 34, which block is formed from concrete having steel lugs 41 included therein and projecting out both sides thereof. Planks 36 are disposed between adjacent layers of blocks as best shown in FIGS. 2 and 9. When gripping a keel block 34, which may weigh up to 25,000 pounds, the hydraulic cylinders 156,162 (FIG. 9) apply sufficient force against the keel block 34 and below the lugs 41 to support the keel block. The operator may actuate several controls including controls for driving the vehicle 20, rotating the upper works 70 (FIG. 4) about axis A; raising or lowering the boom 22 and upper arm 24 and pivoting the grapple 130 about a vertical axis in order to place the keel block 34 in the desired location.

Figure 10:
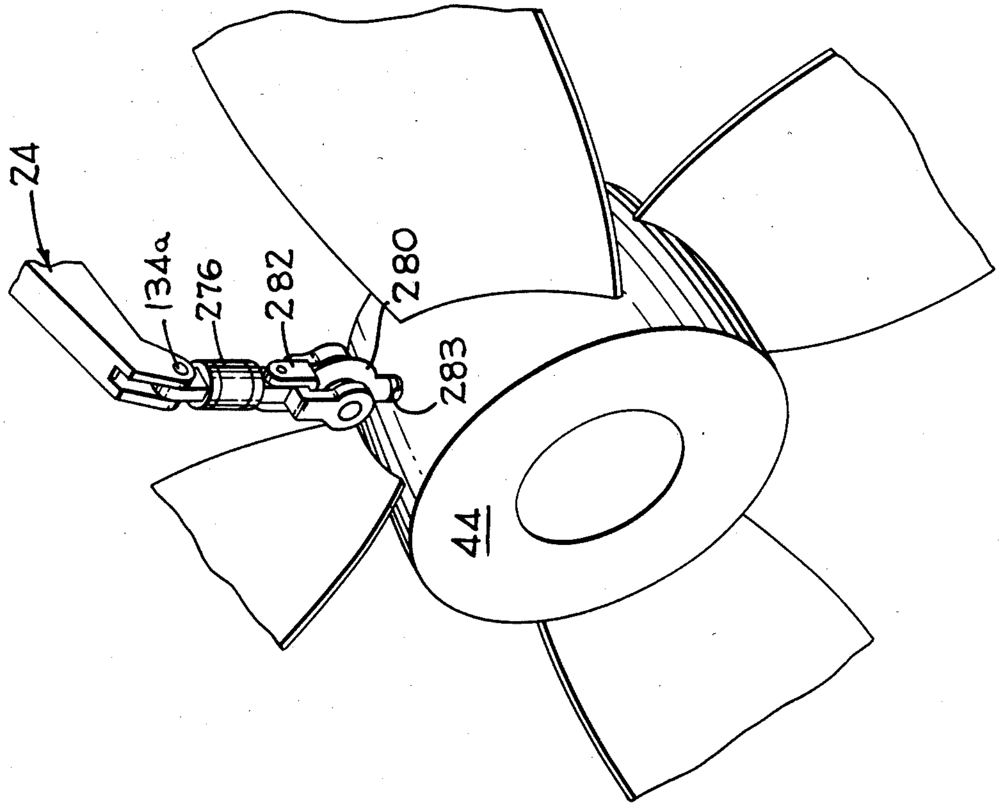
FIG. 10 is an enlarged operational view in perspective illustrating a propeller being connected to the upper arm by a swivel joint and eye bolt, portions of the propeller being cut away.

FIG. 10 illustrates the propeller 44 connected to the upper arm 24 by a swivel joint 276 that is connected to arm 24 by the pivot pin 134*a*, and to an eyebolt 280 by shackles 282 or drop cables (not shown). The eyebolt is screwed into a threaded hole 283 in the hub of the propeller, which hole is normally closed by a plug (not shown). The multipurpose vehicle will handle propellers that are 23 feet in diameter and weigh up to about 75,000 pounds.

As shown in FIGS. 5 and 11, a winch 284 powered by a hydraulic motor 285 is mounted on the upper works 70 and includes a wire rope 286 which may be used to pull articles along the vehicle supporting surface, or may be trained around a sheave 288 secured to the swivel 276 and be connected to a load L to be lifted.

FIG. 12 illustrates an indicator and warning device 290 for the test pull cylinder 278 (FIGS. 1 and 4A). The device 290 indicates the pull force in pounds and provides an audible and visual warning when the pull force of stroke of the cylinder 278 exceeds preset limits, which warning may be utilized to alert an operator of excessive pressure in the test pull cylinder 278, as may occur, for example, when the wake of a ship acts upon a floating vessel to which the test pull cylinder is connected.

As illustrated in FIGS. 1 and 4A, the test pull cylinder 278 is selectively and normally connected to the free end of the upper arm 24, but may be connected to an intermediate position on the arm 24 as indicated by the swivel joint 276*a* (FIG. 4).

When the multipurpose vehicle is used to test and certify padeyes 26 or 26*a*, the test pull cylinder 278 or 278*a* (FIGS. 1 and 4A) is pivotally attached to the outer end or intermediate portion of the upper arm 24 and to one end of a cable 294 or 294*a*, respectively. At this time the cable is slack and its other end is connected to the padeyes 26 or 26*a* being tested. The pull cylinder 278 or 278*a* is preferably elevated to lie in the horizontal plane of the padeye being tested, as indicated in FIG. 1; or if desired, may be moved to a higher or lower elevation than the padeye being tested. The multipurpose vehicle 20 is then driven in reverse until all slack is removed from the cable at which time the vehicle's conventional brakes are applied to prevent movement of the vehicle relative to its supporting surface 30. The outrigger jacks 124 (FIGS. 4 and 5) are then lowered against the supporting surface to prevent the crane from being tipped over, and hydraulic fluid is directed into the pull cylinder to provide the desired testing force to the particular padeye being tested. The size and purpose for which the padeye is to be used will determine the magnitude of force required for certification, which force may be up to about 50,000 pounds. In the event the padeyes should break, or should be pulled off the ship, while being tested, the operator in the cab 74 is protected from flying parts by bars 74*a* surrounding the cab 74.

When the padeye test is completed, the hydraulic fluid is first released from the pull cylinder 278, and then the above described procedure is reversed permitting the operator and an assistant to thereafter test all padeyes on the ship.

Figure 13:
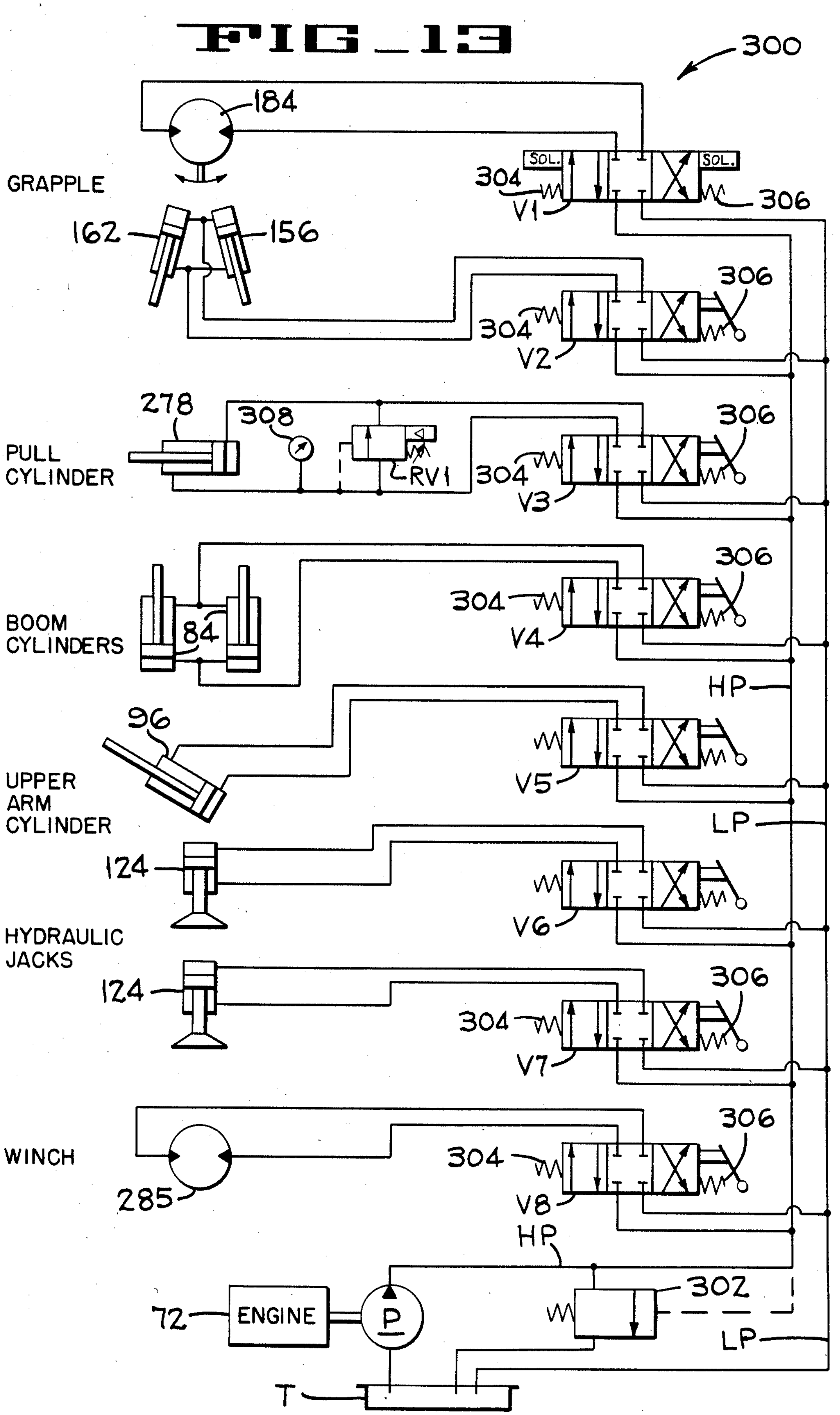
FIG. 13 is a hydraulic diagram illustrating a simplified hydraulic circuit.

A simplified hydraulic circuit 300 (FIG. 13) is provided for manually controlling the operation of the boom cylinders 84 which raise and lower the boom 22, the upper arm cylinder 96 which raises and lowers the upper arm 24, the jacks 124, the pull cylinder 278 on the upper arm 24, the hydraulic motor 184 and hydraulic cylinders 156,162 which operate the grapple 130, and the winch motor 285.

The hydraulic circuit 300 includes a pump P driven by the vehicle engine 72. The pump receives fluid from a tank T and returns the fluid to tank T if the pressure in the high pressure line HP exceeds a predetermined amount by opening a spring loaded pilot operated relief valve 302. A low pressure line LP returns fluid to tank T from the several cylinders and motors.

A plurality of manually operated valves V1-V8 are each connected to the high pressure and low pressure lines HP and LP, respectively. Each valve is normally held in a closed flow blocking position by springs 304,306, and includes a parallel passage position and a cross passage position.

In order to rotate the grapple 130 in one direction, the valve V1 is electrically moved into its parallel passage position, and to rotate the grapple in the opposite direction valve V1 is moved into its cross passage position and is returned to the neutral position when the desired angular position is reached.

The grapple tong cylinders 162,156 are opened by shifting valve V2 into its parallel passage position, and are closed by moving valve V2 into its cross passage position. The test pull cylinder 278 for testing the padeye is retracted to apply a pulling force against the padeyes by shifting valve V3 into its parallel passage position at which time the tensioning force is displayed on a pressure gauge 308, and/or by the test pull indicator warning device 290 (FIG. 12). The valve V3 is held in its parallel passage position when the desired testing force is reached. The oil is relieved across relief valve RV1, which is setable from operator's station, and returns to tank. This allows for cylinder extension and retraction during pull testing, to compensate for ship movement. The piston in the cylinder is extended by moving the valve to its cross passage position.

The boom 22 is elevated by cylinders 84 in response to shifting valve V4 into its parallel passage position, and is lowered by moving the valve V4 into its cross passage position.

The upper arm 24 is raised by cylinder 96 in response to shifting the valve V5 to its parallel passage position and is lowered in response to positioning the valve V5 in its cross passage position.

The two hydraulic outrigger jacks 124 are independently raised by shifting the valves V6 and V7 to the parallel passage positions, and are lowered to their operative vehicle stabilizing positions by independently shifting the valves V6 and V7 to their cross passage positions.

The winch motor 285 rotates the winch 284 in one direction by shifting valve V8 to its parallel passage position, and is rotated in the opposite direction by shifting the valve V8 into its cross passage position.

It will be understood that certain protective circuits, check valves, and other conventional hydraulic circuitry have been omitted from the illustrated hydraulic circuit 300 for simplicity.

From the foregoing description it is apparent that the multipurpose vehicle of the present invention is highly maneuverable and is capable of performing many jobs including pulling and replacing ship propellers from confined areas, testing padeyes for periodic certification and for lifting many types of loads such as keel blocks weighing up to 25,000 pounds. The vehicle may operate within a dry dock or may be lifted out of the dry dock and be used on a wharf. Also, the vehicle's boom and upper arm may be pivoted downwardly to an elevation no higher than its cab and thus may pull or carry articles into buildings on the wharf. Furthermore, the winch may be used to pull articles along the vehicle's supporting surface, or may be trained over a sheave connected to the upper arm for lifting and transferring articles to different loca- tions.

Although the best mode contemplated for carrying out the present invention has been herein shown and described, it will be apparent that modification and variation may be made without departing from what is regarded to be the subject matter of the invention.

What is claimed is:

1. An endless track driven vehicle for tension testing an article to withstand a predetermined force, comprising:
- a pair of endless tracks supporting the vehicle on a surface;
- a boom pivotally supported on said vehicle for pivotal movement about a first horizontal axis;
- an upper arm pivotally supported on said boom for pivotal movement about a second horizontal axis;
- a flexible connector;
- a hydraulic cylinder;
- said flexible connector and hydraulic cylinder being connected between the upper arm and the article being tested;
- first power means for moving said arm and said boom to a height for supporting said cylinder at the same elevation as that of the article being tested;
- second power means for driving the tracks of the vehicle and moving the vehicle away from the article being tested until substantially all slack is removed from said flexible connector;
- first valve means for directing hydraulic pressure to said hydraulic cylinder;
- second valve means for maintaining a selected pressure within said cylinder for applying said predetermined force to said article;
- means defining an outrigger assembly connected to one end of said vehicle;
- a pair of jacks on said outrigger assembly and disposed between said vehicle and the surface, said jacks being disposed above said surface until substantially all of said slack is removed from the flexible connector and is thereafter urged downwardly against said surface for preventing tip over of the vehicle when applying said predetermined force to the article; and
- wherein said predetermined test force is up to about 50,000 pounds, and
- wherein said hydraulic cylinder may be raised to a height of about 40 feet above said surface, and
- wherein the article is a padeye rigidly secured to a ship when in dry dock.

2. A method of tension testing an article to a predetermined force with the aid of an operator controlled vehicle having ground-engaging drive and associated brakes and pivotally supporting a boom and an upper pivot arm about horizontal axes with a flexible connector and hydraulic cylinder connected between the upper arm and the article being tested; said method comprising the steps of:
- moving said cylinder to substantially the same elevation as that of the article being tested;

driving the vehicle away from the article being tested until substantially all slack is removed from said flexible connector;

applying said brakes;

directing a predetermined constant pressure to said hydraulic cylinder for applying said predetermined force to said article; and wherein said article is a padeye secured to a floating ship moored to a wharf; and additionally comprising the steps of:

detecting pressures from said cylinder in excess of said constant pressure caused by said ship being moved excessively by the wake of a passing vessel; and alerting the operator to said excessive pressure.

3. The tension testing method according to claim 2 wherein the vehicle includes an outrigger assembly on one end of the vehicle with outrigger jacks thereon, and additionally comprising the step of lowering the outrigger jacks against the wharf after said slack has been removed from the flexible connector for preventing tip-over of the vehicle when applying said predetermined force to the article.

4. The tension testing method according to claim 3 wherein said predetermined force is up to about 50,000 pounds.

5. The tension testing method according to claim 4 wherein said flexible connector is a wire rope.

* * * * *